United States Patent Office 3,350,468
Patented Oct. 31, 1967

3,350,468
QUADRICYCLONON-8-ENE AND ITS PRODUCTION
Lawrence G. Cannell, Albany, Calif., assignor to Shell Oil Company, New York, N.Y., a corporation of Delaware
No Drawing. Filed Mar. 25, 1966, Ser. No. 537,286
3 Claims. (Cl. 260—666)

This invention relates to quadricyclo(2.2.1.2$^{3,5}$.0$^{2,6}$)-non-8-ene and its preparation.

The general class of substituted quadricyclo(2.2.1.2$^{3,5}$.0$^{2,6}$)nonanes is known in the art, being produced by condensation of bicyclo(2.2.1)hepta-2,5-diene with certain ethylenic compounds activated by the presence of an electron-withdrawing group as a substituent on one carbon atom which is a member of the ethylenic linkage. For example, Schrauzer, Chem. Ber., 95, 2764 (1964), discloses the production of an 8-cyanoquadricyclo(2.2.1.2$^{3,5}$.0$^{2,6}$)-nonane by reaction of bicycloheptadiene and acrylonitrile. Although other 8-substituted quadricyclononanes are produced by similar procedures, methods of producing the unsaturated hydrocarbon quadricyclonon-8-ene have not been available.

It is an object of the present invention to provide the novel compound quadricyclo(2.2.1.2$^{3,5}$.0$^{2,6}$)non-8-ene. An additional object is to provide a method for the production thereof.

It has now been found that these objects are accomplished by pyrolyzing hexacyclo(7.2.1.1$^{3,7}$.1$^{5,13}$.0$^{2,8}$.0$^{4,6}$)-tetradec-10-ene at certain elevated temperatures.

The precursor employed is the hexacyclotetradecene represented by the formula

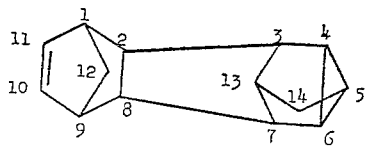

wherein the added numerals indicate one conventional method of identifying the relative locations of the carbon atoms present. This compound, a dimer of bicycloheptadiene, and a method for its production are disclosed by Bird et al., Tetrahedron Letters, No. 11, 373 (1961). A more efficient method of producing the hexacyclotetradecene is disclosed by the German Patent No. 1,197,083 issued July 22, 1965, to Shell Internationale Research Maatschappij N.V. It should be appreciated that the above hexacyclic structure offers the possibility of stereoisomerism, whereby stereoisomers differ by cis-trans and/or endo-exo relationships. The process of the invention is not dependent, however, upon utilization of any particular stereoisomeric form.

The hexacyclotetradecene reactant is converted to the desired quadricyclononene by pyrolysis at temperatures from about 300° C. to about 600° C., although temperatures from about 400° C. to about 500° C. are preferred. The pyrolysis is typically conducted at pressures that are about atmospheric or above, e.g., pressures from about 0.5 atmosphere to about 50 atmospheres. Satisfactory results are customarily obtained when the pressure is substantially atmospheric i.e., from about 0.75 atmosphere to about 5 atmospheres and the utilization of substantially atmospheric pressure is preferred.

In one modification, the thermal conversion of the hexacyclotetradecene reactant is conducted in a batchwise manner as by maintaining the hexacyclic reactant at an elevated temperature and removing the pyrolysis products therefrom as by distillation. In an alternate and generally preferred modification, the pyrolysis is conducted in a continuous manner as by passing the hexacyclic reactant through a heated tube, preferably employing an inert carrier gas such as helium, argon, nitrogen, steam or the like to facilitate passage through the reactor, and condensing the effluent to afford a product mixture containing the desired quadricyclononene. Subsequently, the product mixture is separated and the quadricyclononene is recovered by conventional methods such as fractional distillation, selective extraction, selective adsorption and the like.

The product of the invention is quadricyclo(2.2.1.2$^{3,5}$.0$^{2,6}$)non-8-ene which is depicted by the formula

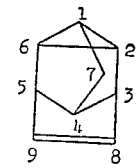

wherein the added numerals indicate one conventional method of identifying the relative locations of the carbon atoms present.

Although the novel quadricyclononene is useful as a fuel, its principal usefulness is in a variety of applications as a chemical intermediate. By employing the ethylenic linkage as a reactive site, the product is polymerized or is copolymerized with reactive olefins or dienes to form elastomers and thermoplastics, for example a terpolymer by copolymerization with ethylene and propylene, and additionally the product is epoxidized at the double bond to the corresponding epoxide which is useful as an epoxy resin precursor.

To further illustrate the process of the invention and describe the novel product thereof, the following example is provided. It should be understood that the details of the process are not to be regarded as limitations as they may be varied as will be understood by one skilled in this art.

EXAMPLE I

The reactor employed in this example was an unpacked Pyrex tube 17 cm. in length having a volume of 13 ml. Into the reactor was introduced nitrogen carrier gas at the rate of 22.4 ml./min. and a mixture of bicycloheptadiene dimers consisting of 94% of hexacyclo(7.2.1.1$^{3,7}$.1$^{5,13}$.0$^{2,8}$.0$^{4,6}$)-tetradec-10-ene at the rate of 9.84 g./hr. (9 ml./hr.). The reactor was maintained at a temperature of 450° C. and the residence time was 0.13 min. The effluent from the reactor was collected in an ice cooled trap and kept cold until the removal of low-boiling products by distillation at reduced pressure. The gross product and all fractions were analyzed by gas-liquid chromatography. The conversion of bicycloheptadiene dimer was 89% and the selectivity to quadricyclononene, based on the hexacyclotetradecene converted, was 99%.

From a similar run, a quantity of the quadricyclo-(2.2.1.2$^{3,5}$.0$^{2,6}$)-non-8-ene was isolated by distillation of the reactor effluent. The quadricyclonene is characterized by a freezing point of −35° C., a density, $D_4^{20}$, of 1.007 g./ml. and a refractive index, $n_D^{20}$, of 1.5050. Mass spectrometric analysis of the product indicated an empirical formula of $C_9H_{10}$ and the infrared and nuclear magnetic resonance spectra of the product were consistent with the above formula.

I claim as my invention:

1. The process of producing quadricyclo$(2.2.1.2^{3,5}.0^{2,6})$-non-8-ene by pyrolyzing hexacyclo$(7.2.1.1^{3,7}.1^{5,13}.0^{2,8}.0^{4,6})$tetradec-10-ene at a temperature of from about 300° C. to about 600° C. and recovering from the resulting product mixture said quadricyclononene.

2. The process of claim 1 wherein the temperature is from about 400° C. to about 500° C.

3. The compound quadricyclo$(2.2.1.2^{3,5}.0^{2,6})$non-8-ene.

References Cited

UNITED STATES PATENTS 3,326,992  6/1967  Muller ------------ 260—666

FOREIGN PATENTS 1,186,052  1/1965  Germany.
1,197,083  7/1965  Germany.

OTHER REFERENCES

Bird et al., "Chem. and Ind.," pp. 20–21, 1960.
Bird et al., "Tetrahedron Letters," No. 11, p. 373, 1961.
Gerhard N. Schranger et al., Ber. 97(9), pp. 2451–62, 1964.

DELBERT E. GANTZ, *Primary Examiner.*

V. O'KEEFE, *Assistant Examiner.*